O. FREDERICKSON.
SYSTEM OF INDICATING THE CONTENTS OF LIQUID CONTAINERS.
APPLICATION FILED MAR. 4, 1911.
1,017,091.
Patented Feb. 13, 1912.
2 SHEETS—SHEET 1.
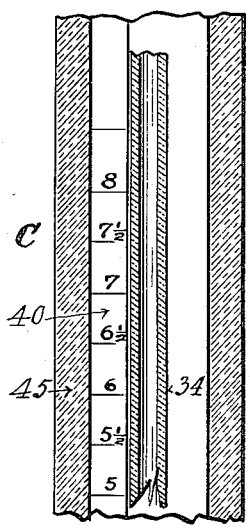
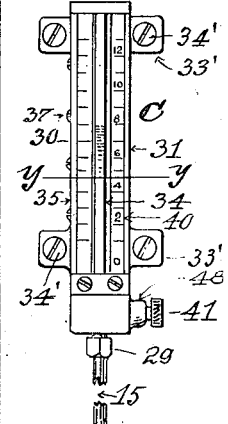
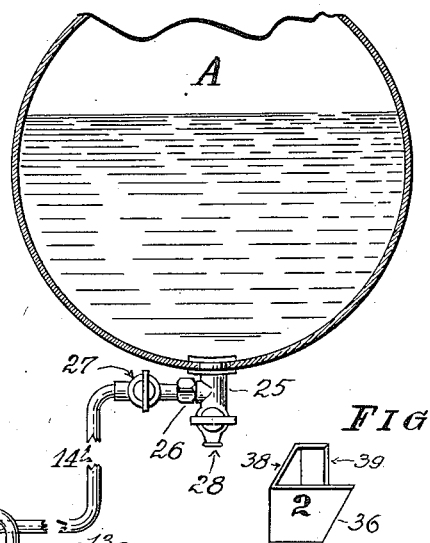
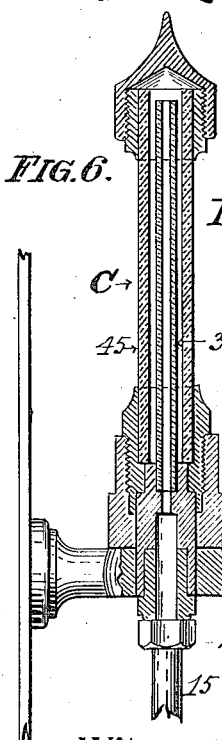
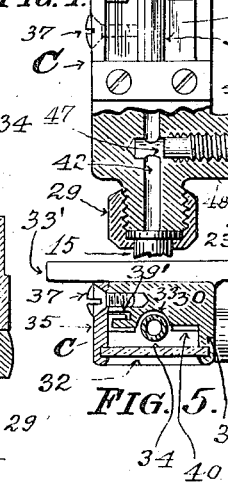
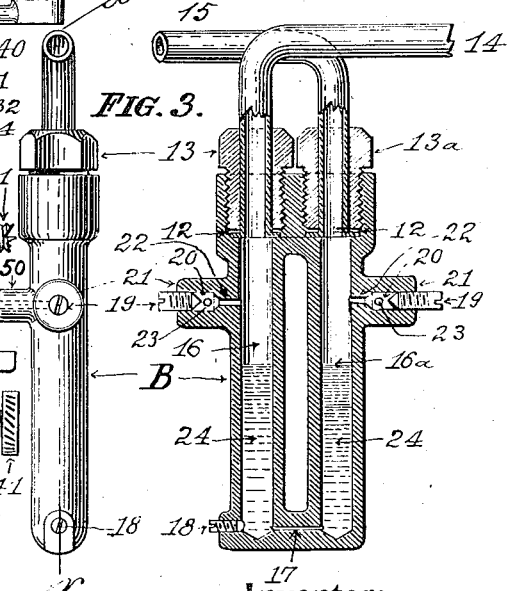
Witnesses:
Inventor:
OSCAR FREDERICKSON,
By Michael J Stark & Sons
Attorneys O. FREDERICKSON.
SYSTEM OF INDICATING THE CONTENTS OF LIQUID CONTAINERS.
APPLICATION FILED MAR. 4, 1911.
1,017,091.
Patented Feb. 13, 1912.
2 SHEETS—SHEET 2.
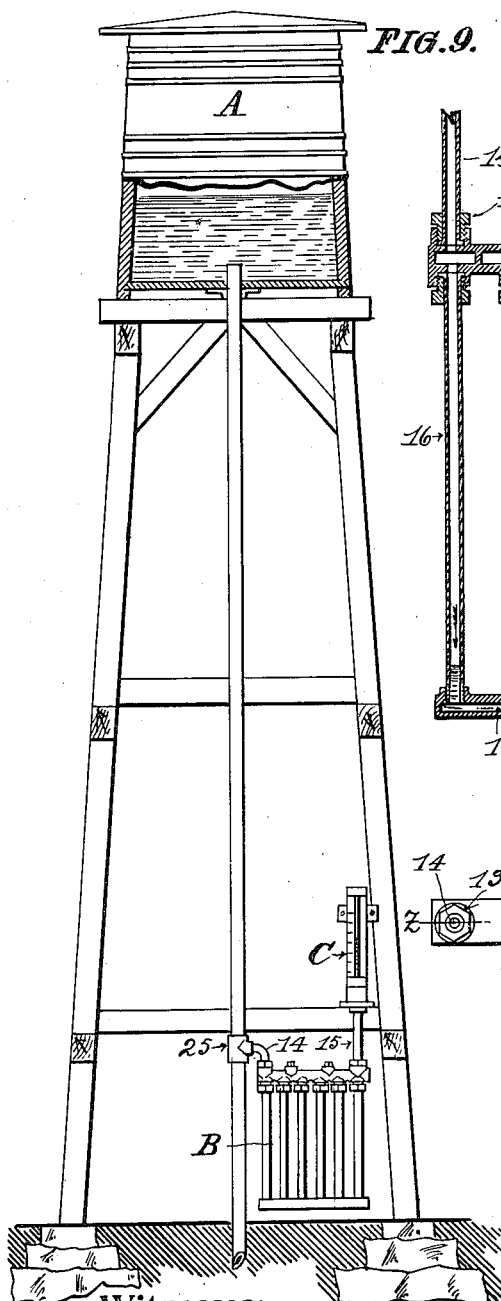
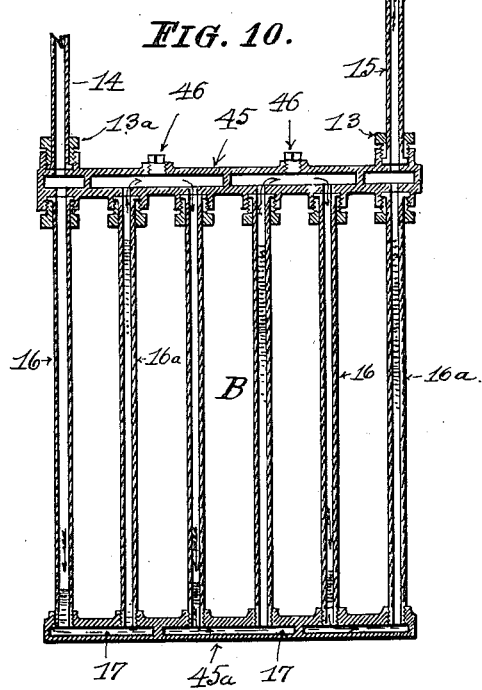
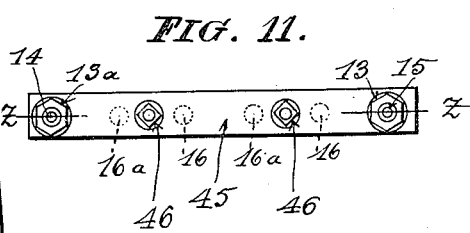
Witnesses:
C. B. Knudsen,
A. S. Peterson.
Inventor:
Oscar Frederickson,
By Michael Stark & Sons,
Attorneys

UNITED STATES PATENT OFFICE.

OSCAR FREDERICKSON, OF CHICAGO, ILLINOIS.

SYSTEM OF INDICATING THE CONTENTS OF LIQUID-CONTAINERS.

1,017,091.  Specification of Letters Patent.  Patented Feb. 13, 1912.

Application filed March 4, 1911. Serial No. 612,369.

*To all whom it may concern:*

Be it known that I, OSCAR FREDERICKSON, a citizen of the United States, and resident of Chicago, in the county of Cook and State of Illinois, have invented certain new and useful Improvements in Systems of Indicating the Contents of Liquid-Containers; and I do hereby declare that the following description of my said invention, taken in connection with the accompanying sheets of drawings, forms a full, clear, and exact specification, which will enable others skilled in the art to which it appertains to make and use the same.
This invention has general reference to indicators for liquid containers; and it consists, essentially, in the novel and peculiar combination of parts and details of construction, as hereinafter first fully set forth and described, and then pointed out in the claims.

The object of this invention is the production of an efficient, serviceable, and reliable indicator for liquid containers, which shall, at a distance from the container, show the height of the contents thereof.

While primarily designed for indicating the amount of gasolene contained in a gasolene tank of an automobile, gasolene launch, airship, or similar contrivance, my invention is also well adapted for use in stationary water tanks for buildings, railway water tanks, stand-pipes for waterwork systems, and similar uses.
In the drawings already referred to, which serve to illustrate this invention more fully, Figure 1 is a diagrammatic view of my invention, the liquid container being shown in section and the remaining parts and elements being illustrated in elevation. Fig. 2 is a longitudinal sectional elevation of the mercury container, drawn on line *x x* of Fig. 3. Fig. 3 is an end elevation of the same. Fig. 4 is an elevation partly in section, of a fragment of the indicator illustrated in Fig. 1. Fig. 5 is a sectional plan on line *y y* of Fig. 1. Fig. 6 is a longitudinal sectional elevation of a modified form of construction of the indicator. Fig. 7 is a perspective view of one of the adjustable pointers employed in the preferred embodiment of this invention. Fig. 8 is an elevation on an increased scale of a portion of the indicator illustrated in Fig. 6. Fig. 9 is an elevation of a water tank supplied with my improved indicator, part of the figure being in section. Fig. 10 is a sectional elevation of a mercury column having a multiple series of coacting mercury chambers, the figure being on line *z z* of Fig. 11.
Fig. 11 is a plan of the same.

Like symbols and characters of reference denote the same parts in all the figures.

A, in the drawings designates a liquid container or storage tank of any construction, contour, or capacity, such as a gasolene tank for an automobile, motor boat, airship, stationary internal combustion engine, a water tower, water tank for railway supplies, &c., of which the amount of the liquid contained in the tank, expressed in inches, feet, or gallons, is to be shown at a distance from the tank.

B, indicates a mercury column, and C, a liquid-containing indicator or gage, the mercury column B, and the indicator C, being located anywhere and at any distance from the tank A.

The mercury column comprises a preferably cast iron body the upper end of which is provided with a multiplicity of bores 12, which are internally screw-threaded to receive coupling-nuts 13, 13ª, whereby a supply-pipe 14, and a discharge-pipe 15, are removably connected to said mercury column, said supply-pipe 14 leading from the tank to the mercury column, and the discharge-pipe 15 connecting the mercury column to the indicator C. In this body of the mercury column there is a series of tubes 16, 16ª, forming chambers, said chambers being connected at their lower ends by a vein or passage 17, a plug 18, being inserted in the outer end of the vein 17 to close the same at that end, while a further set of plugs 19, inserted in screw-threaded bores 20, in side-wise projecting bosses 21, serves to open and close passages 22, leading from the chambers 16, 16ª, to the outer atmosphere by escape openings 23.
The chambers 16, 16ª, are filled to approximately one half of their height with mercury 24, the object of which will hereinafter more fully appear.

In the lowermost portion of the tank A there is a fitting 25, to which the supply-pipe 14 is coupled by a union 26; a stop-cock 27, being located in said supply-pipe to cut off the liquid from the tank to the mercury column whenever desired, while a pet cock 28, is provided to drain the tank when found necessary.

The discharge-pipe 15 connects to the indicator C by a union 29. This indicator, as illustrated in Figs. 1, 4, and 5, comprises a substantially rectangular body 30, which has at one side a projecting member 31, which is longitudinally grooved to receive a transparent plate 32, and has in its face a substantially semi-circular groove 33, in which there is located a glass tube 34, which connects with the pipe 15 in any desired and efficient manner. At the side of the body 30, opposite the one having the projecting member 31, there is a bar 35, which projects beyond the face of the body 30 and has a longitudinal groove the same as, and coacting with, the groove in the projecting member 31, to retain the transparent plate 32 in proper position, said plate 35 serving also as a clamp to hold movably arranged index tabs or pointers 36, in adjusted position, said plate or bar 35 being held to the body 30 by screws 37.

The tabs 36, one of which is shown in perspective in Fig. 7, comprise a face-plate upon which the proper numeral or other indicating character is placed, a side-member 38, at right angles to the face plate, and a back member 39, at right angles to the side member and substantially parallel to the face plate, the said back member 39 entering a longitudinal groove 39', in the side of the body 30, as shown in Fig. 5, so that when the clamping bar 35 is screwed up, the index tabs 36 are securely held in position.

At the side of the indicator tube 34 opposite the one having the index tabs 36, there is, or may be, located an index plate 40, which, when the index tabs are arranged to indicate gallons, may be designed to register inches, feet, or any other unit of measuring liquid.

In the body 30, and at the lower end thereof, there is transversely arranged, an adjusting screw 41 in the internally screw-threaded bore 47 of the boss 48, by which the height of the liquid in the glass tube 34 may be increased and decreased by screwing the screw 41 in the proper direction. And in order to enable this indicator being securely fastened to a wall or other object, it is provided with lugs 33', through which screws 34', are passed.

I have thus described the preferred embodiment of my invention of the indicator C, but I desire it to be understood that I do not wish to confine myself exclusively to this specific construction of the same, and in Figs. 6 and 8, I have illustrated a modified form of construction of this indicator. In these figures the glass tube 34 is shown inclosed in a larger glass tube 45, through which the glass tube 34 may be observed, and the index scale or plate 40 is placed in the space between the two tubes, a construction common in thermometers, hydrometers, and other analogous physical instruments.

The operation of this system of indicating the height of a column of liquid, is substantially as follows: When the stop-cock 27 in the supply-pipe 14 is opened, liquid from the tank will pass to the mercury column in the chamber 16 and depress the mercury therein causing the mercury in the coacting chamber 16$^a$ to rise. In the discharge pipe 15 there is a non-freezing liquid or fluid such as colored alcohol, spirits, glycerin, &c., which, when the mercury columns in the chambers 16, 16$^a$ are at a level, reaches to the zero mark in the glass indicator tube 34. The pressure in the tube 14 causes the mercury in the chamber 16 to be depressed and in the chamber 16$^a$ to rise accordingly, thereby forcing the liquid in the pipe 15 and the glass indicator tube 34 to rise also. In cases where the pressure of the column of the liquid acting upon the mercury column is comparatively low, I make the bore in the glass tube 34 comparatively small, whereby the movement of the liquid in the tube 34 is greater than that in the pipe 15, so that the indications on the index scale are not so close together as to be crowded, as would probably be the case in gasolene tanks for internal combustion engines &c., while in the case of elevated water tanks, where the pressure at the point where the mercury column is located may be high, I provide the mercury column with a series of coacting mercury chambers, as shown in Figs. 9, 10, and 11, in which the mercury, acting, one column upon the other, with a compressible fluid in the spaces between the adjacent columns, decreases in its rise in each successive column so that the rise of the liquid in the indicating glass tube is but a fraction of the rise of the mercury in the first column.

In order that inclining the mercury column C may not affect the indications of the indicator, as for instance when used in an airship, I have crossed the ingress and egress tubes 14, 15, by leading the ingress tube 14 to the chamber 16, and the egress tube 15 from the chamber 16$^a$, so that if the mercury container B leans say toward the right and the level in the adjacent chambers rises and falls accordingly, they will neutralize each other in the effect produced.

The divisions of the index scales 36 and 40 may denote inches or feet in height of the liquid in the tank A, or its contents in gallons, or both, and these divisions, which are governed by the height and diameter, or the cubic contents of the tank will, therefore, have to be ascertained in each case by actual trials, but remain constant under the same general conditions when once ascertained. And in order to facilitate the arranging of a proper index scale, I have made the index pointers 36 carrying the index characters, movable so that they may be properly located and then permanently fixed by screwing up the screws in the clamping bar 35.

When a multiple series of coacting mercury columns is employed, I construct the same in the preferred form of so-called manifolds 45, 45ª, being tubes having a series of branches to which the tubes 16, 16ª, are secured, as shown in Figs. 10 and 11, there being in the manifold 45 plugs 46, which, when removed, provide for openings through which the measured quantities of mercury may be introduced.

I have heretofore mentioned that the adjusting screw 41 in the indicator C is designed to increase or decrease the height of the liquid in the glass tube 34. The object of this arrangement is to compensate for any loss by leakage or otherwise, or variation in temperature, of the fluid in said glass tube 34, so that the proper level of the said fluid, to agree with the position of the indicator pointers, may at all times be maintained, by proper manipulation of the thumb screw 41. I have also mentioned the passages 23 in the bosses 21 of the mercury column B. These passages 23 are in nipples 50, at the side of the bosses 21, and their object is to enable the discharge tube 15 and the glass tube 34 in the indicator C being filled with said fluid by unscrewing the screw 19 and applying a hose to this nipple and forcing the fluid into the chamber 16ª, pipe 15 and glass tube 34 by means of a suitable contrivance, while the passage in the nipple 21 on the tubular chamber 16 is to permit air to escape from the pipe 14 when the stop-cock 27 is opened.

Having thus fully described this invention, I claim as new and desire to secure to me by Letters Patent of the United States—

1. An indicating system for liquid containers, comprising, in combination, a tank, a mercury container located below said tank and including a multiplicity of chambers connected in series, a tube connecting said tank to the first one of said chambers, mercury in each of said chambers occupying normally approximately the lower half of said chambers, the liquid in said tank acting upon the mercury in the first chamber by gravity, a liquid-operated indicator located at a distance from said mercury container, a tube connecting said indicator to the last one of the said chambers, there being in said indicator a transparent tube smaller in diameter than the tube connecting said indicator to said chamber, a liquid in the last said tube and the indicator tube acted upon by the mercury in the last one of said chambers, whereby the vertical movement of the mercury in said chambers caused by the varying column of liquid acting upon the said mercury in the first chamber is transmitted to the liquid in the indicator tube and increased therein in the same ratio as the diameter of the indicator tube bears to that of the indicator-connecting tube, as set forth.

2. An indicating system for liquid containers, comprising, in combination, a tank, a discharge pipe connected to said tank at its lowermost point, a mercury container comprising an integral body of tubular members, a tubular boss projecting laterally from the first of said tubular members and a further tubular boss projecting laterally from the last of said tubular members, both bosses being located near the upper ends of said tubular members, a nipple on each of these tubular bosses, screw-actuated valves in said tubular bosses, connecting means at the upper ends of said first and last tubular members to one of which said discharge tube is removably connected, a tube removably connected to the other of said connecting means, a liquid-operated indicator located at a distance from said mercury container and connected thereto by a tube, and means in said indicator for increasing and decreasing the cubic contents of the latter tube, as stated.

3. In a system of indicating the height of liquid in liquid containers, a mercury-actuated device operated by the liquid in said container comprising an integral body having a multiplicity of chambers connected in series, there being on the ingress and egress chambers of the series connecting means and tubes removably connected to said connecting means, branches leading from said ingress and egress chambers, nipples on said branches whereto a hose may be attached, valve seats in said branches and screw-operated valves in said branches constructed to open and close communication between said chambers and the outer atmosphere, as specified.

4. In an indicating system for liquid containers, the combination, of a tank, a discharge pipe leading from said tank, a mercury container to which said discharge pipe is connected, a further pipe leading from said mercury container, and an indicator to which said latter pipe is connected, said indicator including a body, means on said body for increasing and decreasing the cubic contents of the last-mentioned pipe, a glass indicating tube, and a movable indicator scale, said scale comprising separate, adjustable members, and a plate at the side of said body for simultaneously clamping said separate members to said body, as specified.

5. A system for indicating the height of liquid in liquid containers, comprising a tank, a mercury container located below said tank, a pipe connecting said mercury container to said tank, an indicator, and a pipe connecting said indicator to said mercury container, said mercury container comprising a series of connected tubes adapted to contain mercury, said indicator including a body, a glass indicating tube on said body, and a series of separate, movable, indicating pointers on said body, said indicator pointers being secured to said body in adjusted position by a clamping bar acting simultaneously upon all of said indicating pointers.

6. A system of indicating the height of liquid in a liquid container, comprising, in combination, a tank, a mercury container located below and at a distance from said tank, and a fluid-actuated indicator, said mercury container including a series of adjacent, connected tubes in spaced relation, an ingress pipe connecting the first of the series of tubes to said tank, and an egress pipe connecting the last of the series of tubes to said indicator, there being on the first and on the last of the series of tubes means for filling said tubes with liquid, and in the indicator means for varying the cubic contents of said indicator-connecting tube, whereby the level of the liquid in the indicator may be adjusted, as described.

In testimony that I claim the foregoing as my invention, I have hereunto set my hand in the presence of two subscribing witnesses.

OSCAR FREDERICKSON.

Witnesses:
FREDA T. LEBERSTEIN,
MICHAEL J. STARK.